T. T. JARRET.
Horse Hay Fork.
No. 1,939.
Reissued April 18, 1865.
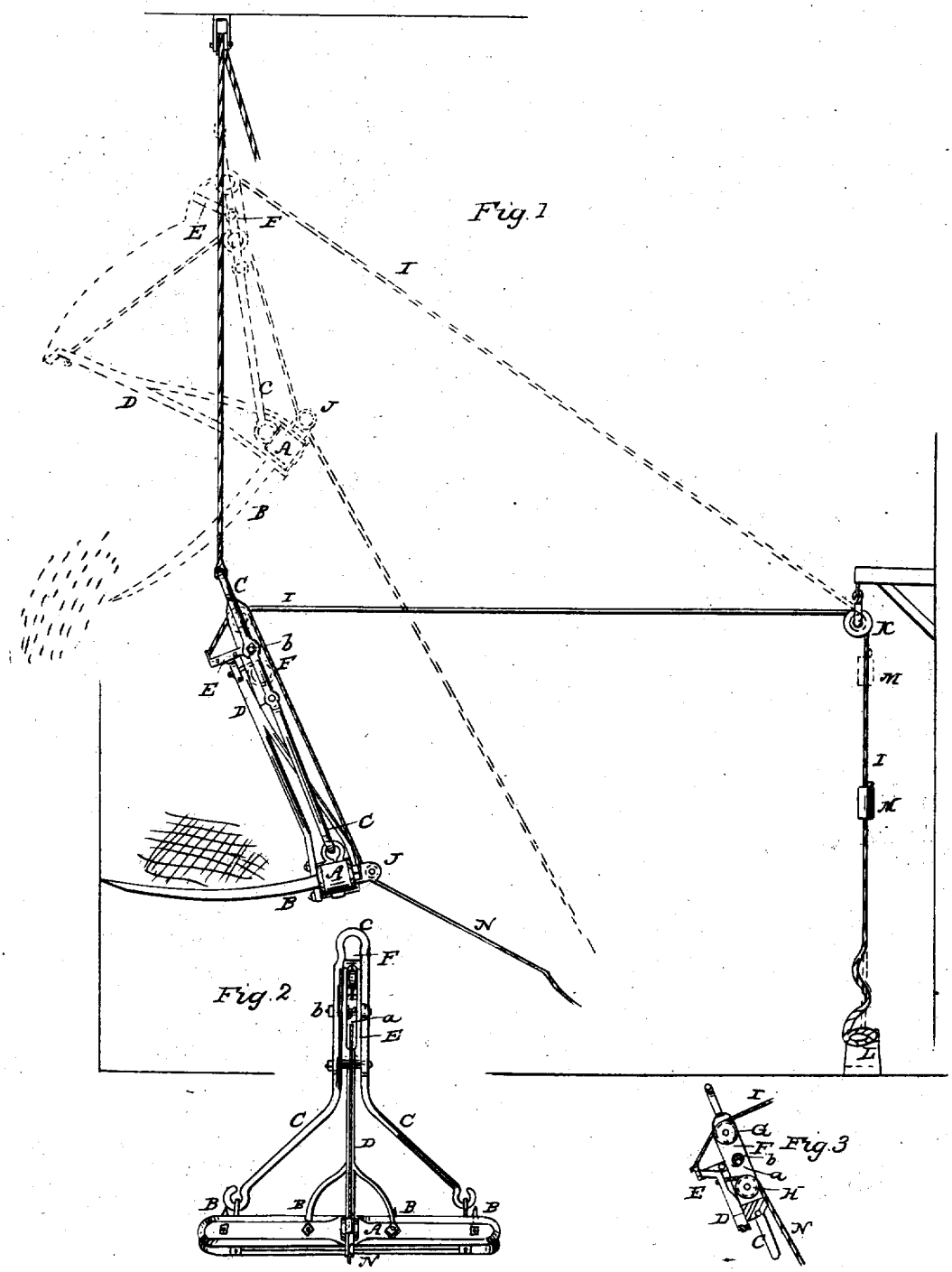
N. PETERS. Photo-Lithographer. Washington. D. C.

UNITED STATES PATENT OFFICE.

BENJAMIN F. HISERT, OF GREENVILLE, NEW YORK, ASSIGNEE OF THOMAS T. JARRETT.

IMPROVEMENT IN HAY-ELEVATING FORKS.

Specification forming part of Letters Patent No. 10,989, dated May 30, 1854; Reissue No. 1,939, dated April 18, 1865.

*To all whom it may concern:*

Be it known that THOMAS T. JARRETT, of Horsham, in the county of Montgomery and State of Pennsylvania, did invent certain new and useful Improvements in Hay-Elevating Forks; and I do hereby declare that the following is a full, clear, and exact description thereof, reference being had to the accompanying drawings, making a part of this specification, and in which—

Figure 1 represents a side view of the fork when drawn up from the load, the dark lines showing it in proper position for carrying or sustaining the load, and the red lines the position of the fork after the catch has been raised and the weight of the hay has upset the fork, thereby causing the hay to fall from the tines. Fig. 2 is a rear elevation of the fork. Fig. 3 is a vertical section, taken through the handle or bail, and shows the position of the pulleys and spring-catch, to be hereinafter described.

This invention consists in certain means by which the discharge of the hay can be effected automatically when the fork has reached any desired elevation; also, in the use of one or more pulleys, combined with the handle or bail of a hay-elevating fork, for the discharge or other cord to run over; also, in the use of a pulley at or near the lower and back portion of the head for the rope to pass under, which is used to guide the fork or draw it back to the hand of the operator; also, in securing the handle or bail to the head by means of loop-eyes secured in the same and projecting therefrom; also, in securing the tongue or lever, which is firmly attached to the head, (and which is used to keep the tines of the fork in a proper position to retain or carry the load,) to the handle or bail by means of a spring-catch attached thereto; also, in the combination, with a hay-fork, of a spring-catch turning on a pin or bearing, and which is used both to keep the tines of the fork in a position to retain the load and to discharge it at any desired moment.

To enable others skilled in the art to make and use the invention, I will proceed to describe its construction and operation, similar letters representing like parts in all the figures.

A is the head, made of wood, about three and one-half inches square. A wooden head possesses many advantages over an iron one, among which are its cheapness, lightness, facility of manufacture, and less liability to twist or bend. In using wood I am able to have a head much larger, the thickness of which acts as a bearing or support for the ends of the tines and keeps them from being twisted or bent in their sockets. An iron head that would present as much bearing-surface for the ends of the tines as I am able to give in the wooden head would make the fork so heavy as to render it nearly useless.

The tines B B are of curved form, sharp-pointed at the end which enters the hay, and the other end is tapered a length a little more than equal to the thickness of the wooden head, and a thread is cut on the end of this taper to receive a nut. This tapering end enters a mortise of suitable size to receive it, passes through the head and enters a nut, so that as the tines become loose the nut can be turned up, and thus draw the tines farther in the head, so that they will be held therein as firmly as ever. The curve to the tines is such that their outer ends or points shall extend up and above the head that receives them, thus throwing the points of the teeth and the point where the power is applied to the fork in such relative position to each other that the angle formed by two lines drawn, one from the points of the teeth and the other from the top of the fork, where the power is applied, along the front surface of the tongue, or handle, or bale, (whichever is nearest the points of the tines, and against which the hay crowds,) and intersecting at the center of the head, shall form an angle considerably less than a right angle—an angle of about sixty-five or seventy degrees—so that when power is applied to the fork, or when swinging clear of the load, the tendency of the hay is always to crowd toward the head, thereby enabling the fork to take up a larger load, and throwing the weight of the hay, when swinging clear, against the head, thus relieving the points of the tines of the weight and rendering them more durable and effective.

D is a tongue or brace-lever, of iron or other metal, which is made rigid, and is securely attached to the piece that receives or holds the tines, and serves to keep the tines in a proper position to retain or carry the hay.

C is the bail or handle, to the end of which the head is attached by means of loop-eyes secured in and projecting from the head, so that the head can turn freely and discharge the load when it is not held in a position to carry or retain the load.

E is a spring-catch, which turns on a pivot or bearing secured to the bail or handle. The point where this catch is secured to the handle or bail is about opposite to the point where the free end of the tongue or lever meets the handle or bail. The catch E is intended to operate upon the end of the tongue or lever to retain it in such a position that the tines will carry or retain the hay, and it is provided with a spring, *a*, the tendency of which is always to press the catch in such a direction that it will operate upon the tongue or lever and act as a detainer for it. When a greater force than that of the spring is applied to the catch in an opposite direction the catch will be removed from the end of the tongue or brace-lever and the tines will assume the position shown in red lines in Fig. 1.

J is a pulley, situated at the back and lower portion of the head for the rope to pass under, which is used to guide or draw the fork back to the operator.

Between the sides of the bail or handle there are placed two pulleys, G and H, one above the other. When the tines have a load of hay upon them the friction produced upon the devices that retain the tines in that position is very great, and in order to move these devices so that the hay shall be discharged requires considerable force to be applied to the rope attached thereto. Now, by means of a pulley the wear upon this rope is greatly diminished, and by its passing over the pulley much less force is needed on the rope to move the catch. The discharge-rope I passes over one pulley and is attached to the catch, generally at a point thereon where the greatest leverage can be obtained. A rope, N, is used to guide and control the motion of the fork and to assist in closing the same, and is attached to the upper end of the tongue or brace-lever, so that the lever may be drawn up against the handle or bail and be there retained by the catch. The rope is then passed over the pulley H and under the pulley J. These two ropes are left any length the operator may desire or be most convenient for him. The rope I may be passed through an additional pulley or eye secured to a beam or rafter and have a weight attached to its other end, so that when the fork shall have arrived at a certain height the weight will produce sufficient tension upon the cord to raise the catch and permit the fork to turn and discharge the hay. The position of this weight on the rope can be varied so as to raise the catch when the fork shall have arrived at any desired height. The weight can be dispensed with and the cords be allowed to drop down within the control of the operator. It may be found convenient to unite the ends of these ropes. The size of the ropes, and whether they are connected or not, or if all one piece, will not in the least affect my invention.

Operation: A rope is attached to the bail or handle of the fork and passed over a pulley secured in a rafter over the mow; thence over and under other pulleys to the place where the horse is to be attached to operate the fork. The fork is now closed, as shown in dark lines in Fig. 1, and the tongue or brace-lever is held firmly against the bail or handle by the spring-catch, thus keeping the tines in the proper position to retain the hay. The tines are now thrust into the hay, the horse is started, and the fork is drawn from the load, bringing with it a quantity of hay. The ropes are within the control of the operator, who guides the fork, when necessary, and when it has reached the desired elevation the proper tension is produced upon the rope I sufficient to draw the catch from the end of the tongue or brace-lever, which allows the tines to drop down and discharge the hay.

Having now fully described the invention, what I claim as new, and desire to secure by Letters Patent, is—

1. The employment or use of a weight on the cord attached to the catch, which shall operate to discharge the hay from the fork at any desired height, substantially as and in the manner described.

2. The combination of one or more pulleys with a hay-elevating fork for the purpose described.

3. The pulley J at the back part of the head, operating as and for the purpose described.

4. Securing the handle or bail to the head by means of loop-eyes which are secured in the head and project therefrom.

5. Securing the tongue or brace-lever to the handle or bail by means of a spring-catch attached to the said handle or bail, for the purpose described.

6. A spring-catch turning upon a pin or bearing, the functions of which are to keep the tines or body of the fork in position to retain the load, and to discharge it whenever desired.

7. In hay-elevating forks, the combination of the tines, the wooden head, the tongue or brace-lever, and the spring-catch.

8. The combination of a spring-catch with a rigid tongue or brace-lever extending from the piece which receives the tines, for the purpose described.

BENJAMIN F. HISERT. [L. S.]

Witnesses:

E. RAMSDELL,

G. W. HUNT.